United States Patent [19]

Fischer

[11] Patent Number: 4,759,458
[45] Date of Patent: Jul. 26, 1988

[54] FILLER NECK ARRANGEMENT FOR A VEHICLE FUEL TANK

[75] Inventor: Roland Fischer, Mallersdorf, Fed. Rep. of Germany

[73] Assignee: Dr. Ing. h.c.F. Porsche Aktiengesellschaft, Stuttgart, Fed. Rep. of Germany

[21] Appl. No.: 49,467

[22] Filed: May 14, 1987

[30] Foreign Application Priority Data

May 14, 1986 [DE] Fed. Rep. of Germany ....... 3616291

[51] Int. Cl.⁴ .............................................. B65B 39/00
[52] U.S. Cl. ................................... 220/86 R; 138/109; 141/1
[58] Field of Search .............. 220/86 R, 85 F; 141/285, 286, 297, 300, 1, 5, 37, 97, 290, 350; 138/26, 109; 137/351, 587, 588

[56] References Cited

U.S. PATENT DOCUMENTS

| 2,138,104 | 11/1938 | Kellogg | 220/86 R |
| 4,450,880 | 5/1984 | Scheurenbrand | 220/86 R X |
| 4,572,394 | 2/1986 | Tanahashi et al. | 220/86 R |
| 4,632,270 | 12/1986 | Sasaki et al. | 220/86 R |
| 4,635,813 | 1/1987 | Peickert | 220/86 R |

FOREIGN PATENT DOCUMENTS

| 2208189 | 8/1973 | Fed. Rep. of Germany . |
| 2353448 | 4/1975 | Fed. Rep. of Germany . |
| 3006317 | 9/1981 | Fed. Rep. of Germany . |
| 2472986 | 12/1980 | France . |

*Primary Examiner*—Mark J. Thronson
*Attorney, Agent, or Firm*—Barnes & Thornburg

[57] ABSTRACT

In order to prevent back spraying of fuel after switching-off of a fuel filler nozzle an expansion space is provided at the fuel tank filler neck in the area of the inserted fuel filler tube, expansion space is formed by a widening of the cross-section of the filler tube. The expansion space widens approximately starting from a free end of the fuel filler tube when in the fuel filling position, in upward direction, in a funnel shape and subsequently is returned to the cross-section of the filling collar supporting the filler tube.

20 Claims, 1 Drawing Sheet

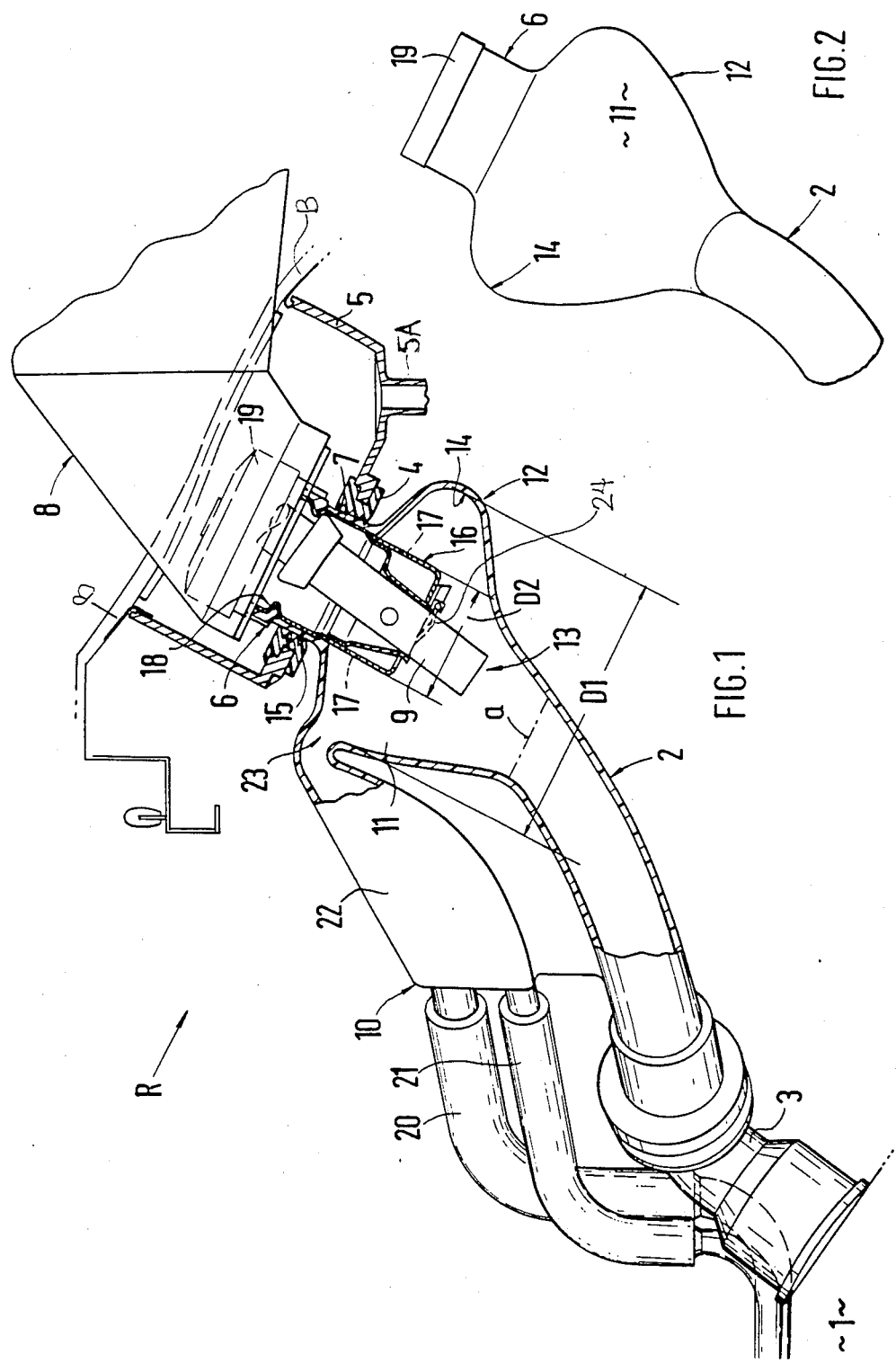

FILLER NECK ARRANGEMENT FOR A VEHICLE FUEL TANK

BACKGROUND AND SUMMARY OF THE INVENTION

The invention relates to a fuel tank filler neck arrangement for motor vehicles at which a receiving element for a fuel injection nozzle and an end-face filling collar are provided, a fuel filler tube of the fuel injection nozzle projecting by sections into the filler neck during the refueling.

In the case of a known fuel tank of the initially mentioned type disclosed in German Published Unexamined Application No. (DE-OS 22 08 189), the filler neck, over its whole longitudinal course, has an approximately constant cross-section. When fuel is filled into this fuel tank, an excess pressure is created in the interior of the tank. Soon after the fuel injection nozzle is switched off, the energy that acted in the filling direction through the fuel injection nozzle is no longer present and the pressure on the inside of the fuel tank is compensated with the fuel column being pressed upward by and in the filler neck. Because of the design of the cross-section of the filler neck, the rising fuel column cannot expand and is therefore thrown to the outside at a relatively high speed, causing not only fuel to be released to the outside but possibly also spraying the person who is refueling.

German Published Examined Application No. (DE-AS 23 53 448) shows a fuel tank having a filler neck, where at the filler neck, below the inserting level of the fuel filler nozzle, a segregating space is formed that has a cross-section that differs from the cross-section of the filler neck. This segregating space, during the refueling process, is used for the separation of the air flowing upwards from the filler neck from the fuel flowing into the fuel tank. This arrangement also has the disadvantage that after the switching off of the fuel filler nozzle, fuel sprays out of the filler neck, because no escape measures are taken for the fuel volume that is being pressed upward; even before the fuel filler nozzle is switched off, the segregation space is filled completely with fuel.

It is an objective of the invention to develop a fuel tank filler neck in such a way that a spraying of fuel out of the filler neck after the switching-off of the fuel filler nozzle is reliably prevented.

According to the invention, this objective is achieved by providing a widening of the upper part of the filler neck to form fuel accumulating expansion space. In especially preferred embodiments, the widening commences at a position adjacent to just below the bottom of the fuel filler nozzle when in its innermost fuel supplying position. In certain preferred embodiments, a cylindrically-formed nozzel receiving element is connected at a collar surrounding the vehicle gas filling opening and protrudes inwardly of the opening with a guide for guiding the fuel filler nozzle. The widened section expansion space of the upper part of the filler neck extends concentrically around the nozzle receiving element and exhibits its maximum diameter adjacent the lower end of the nozzle receiving element. This widened section is narrowed at its top to merge with the connection of the nozzle receiving element adjacent the collar surrounding the gas filling opening in the vehicle body. In certain preferred embodiments, a fuel tank venting device opens into the expansion space adjacent the maximum diameter section of the widened section of the filler neck. In especially preferred embodiments the filler neck, including the widened section, is constructed as an integral one-piece component formed by blow molding of plastic material. The maximum diameter of the widened space is at least twice the diameter of the diameter of the nozzle receiving element.

The main advantages achieved by means of the invention are that by means of the expansion space developed in the area of the fuel filler nozzle at the filler neck, a perfect complete filling with fuel of the fuel tank is ensured. The fuel that is pressed upward, after the switching-off of the fuel filler nozzle, can escape toward the side, into the relatively large-volume expansion space and can expand there. As a result, an emerging of fuel toward the outside is avoided which not only meets the requirement of an improved protection with respect to emissions, but also ensures that the clothes of the person who is refueling are not sprayed with fuel. In addition, the filler neck with the expansion space is constructionally simple and can be produced in a cost-effective way.

Further objects, features and advantages of the present invention will become more apparent from the following description when taken with the accompanying drawings, which show for purposes of illustration only, embodiments constructed in accordance with the present invention.

BRIEF DESCRIPTION OF THE DRAWINGS

FIG. 1 is a schematic partial view of a vehicle fuel tank having a filler neck with expansion space constructed according to a preferred embodiment of the invention; and FIG. 2 is a schematic view taken in the direction of the Arrow R in FIG. 1 and showing the contours of the upper portion of the filler neck.

DETAILED DESCRIPTION OF THE DRAWINGS

FIG. 1 shows an upper partial area of a fuel tank 1 of a motor vehicle that is not shown, said fuel tank having a filler neck 2. The filler neck 2 is connected on the one side with a connecting sleeve 3 of the fuel tank 1 and, on the other side, with the insertion of an elastic sealing ring 4, is held in position at a receiving housing 5 on the side of the vehicle body. Housing 5 includes a drain tube 5A and surrounds a gas filler cap 19, which is covered by a pivotal cover or the like which merges with the vehicle body exterior B. The filler neck 2 has a receiving element 7 for a fuel filler nozzle 8 in the area of an end-face filling collar 6. During refueling, a fuel filler tube 9 of the fuel filler nozzle 8 projects, by sections, into the filler neck 2. The filler neck 2 also interacts with a venting device 10 that extends outside the filler neck 2.

So that, after the switching-off of the fuel filler nozzle 8, no more fuel is sprayed out of the filler neck 2, an expansion space 11 is formed at the filler neck 2 in the area of the inserted fuel filler tube 9, said expansion space 11 being formed by means of a widening 12 of the cross-section of the filler neck 2. The expansion space 11 is developed in one piece with the filler neck 2 and extends essentially above a free end 13 of the fuel filler tube 9 when tube 9 is in its most inwardly protruding position for refueling operations.

According to FIG. 1, the expansion space 11 starts shortly below the free end 13 of the fuel filler tube 9 approximately at the dash-dotted line "a", and expands from there in a funnel-shape in upward direction, until it finally, after a circular cross-sectional shaped area 14, is returned to the cross-section of a filling collar 6. The largest width of the widening 12 of the cross-section is approximately circular and extends concentrically with respect to the filling collar 6. The expansion space 11 ends below the sealing ring 4 of the receiving housing 5. Between the free end 13 of the fuel filling tube 9 and the line "a", the filler neck is formed in such a way that, during the refueling, no swirling takes place in this area.

The cylindrically formed receiving element 7, by sections, projects into the expansion space 11, an upper section 15 of the receiving element 7 supporting itself at the filler neck 2 that surrounds it. The expansion space 11, in the area of the section 16 of the receiving element 7 that projects out of the filling collar 6, has the largest cross-section. The largest diameter D1 of the expansion space 11, in this case, is at least twice as large as the diameter D2 of the filler neck 2 in the area of the filling collar 6.

A venting device 10 leads into the expansion space 11 above the free end 13 of the fuel filler tube 9, namely preferably in the area of its largest diameter D1. At section 16 of the receiving element 7, radial openings 17 are provided through which the air arriving from the venting device 10 can flow off to the outside through the receiving element 7. The filler neck 2 with the expansion space 11 and at least a part of the venting device 10 are formed by a one-piece component made of plastic, that was produced by blow molding.

The receiving element 7 that is inserted into the filler neck is used for the support of the fuel filler nozzle 8, and also on the inside has a thread 18 that interacts with an external thread (not shown) of a closing cap 19. The filler neck 2, below the expansion space 11 reaching to the connecting sleeve 3, has such a cross-section that fuel can only flow into the fuel tank 1, but that no air can emerge from it via the filler neck 2.

The discharge of air from the fuel tank 1 takes place exclusively via the venting device 10 that is composed of the vent lines 20, 21 and a compensating space 22. The compensating space 22, via an opening 23, is connected to the expansion space 11 and is arranged above the vent lines 20, 21.

According to FIG. 1, the bottom side of the receiving element is equipped with a pivotable, spring-loaded flap 24 that, when the fuel filler tube 9 is inserted, is moved downward into an unblocking position that is not shown.

The size of the volume of the expansion space 11 is to be determined empirically and depends on the geometric position of the fuel tank 1 and of the filler neck 2, in which case, when the filler neck extends in a relatively flat course, a larger volume is required than in the case of an approximately vertically extending filler neck 2.

The expansion space 11 has the following function: The fuel tank 1 and the filler neck 2 are filled with fuel until the fuel filler nozzle device 8 is switched off. Subsequently, a pressure compensation takes place in the fuel tank 1, and the fuel is pressed upward in the filler neck 2. By means of the large-volume expansion space 11, the fuel can escape to the side and can expand there so that a spraying-out of fuel is avoided.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A fuel tank arrangement for accomodating filling of a motor vehicle fuel tank, said arrangement comprising:
    a filler neck, said neck having an upper end, an upper portion, a lower end, and walls, said neck being supportable at the upper end at a vehicle body, said neck being connectable at the lower end to a vehicle fuel tank, and
    a receiving element carried on the inside of the upper portion for guiding the position of a fuel filler nozzle tube when it is inserted for fuel filling operations, and
    fuel nozzle abutment means locating a predetermined fuel filling position of a free, open end of the fuel filler nozzle tube in the upper portion of the filler neck during fuel filling operations,
    wherein said filler neck exhibits a fuel accomodating widened expansion space surrounding the receiving element and disposed radially outwardly thereof, wherein said filler neck is configured to widen upwardly in a funnel shape from a position approximately at a level of the free open end of the fuel filler nozzle tube when in its fuel filling position, wherein said widened expansion space extends from an upper portion with the walls of the neck extending from the receiving element radially outwardly and downwardly to a maximum cross-section of the filler neck and then to a lower portion with the walls of the filler neck narrowing in a funnel shape downwardly,
    whereby fuel overflow is limited during fuel filling operations.

2. A fuel tank arrangement according to claim 1, wherein said expansion space extends downwardly of a lower most part of the receiving element.

3. A fuel tank arrangement according to claim 2, wherein said maximum cross-section is exposed above the lower most part of the receiving element.

4. A fuel tank arrangement according to claim 1, further comprising a venting device that is provided outside the filler neck and that is connected with the filler neck, wherein the venting device leads into the expansion space.

5. A fuel tank arrangement according to claim 4, wherein the venting device leads into said expansion space in the area of a largest cross-section of the expansion space.

6. A fuel tank arrangement according to claim 4, including a filling collar, wherein radial openings are provided at a section of the receiving element that projects out of the filling collar for accommodating air flow from the venting device to the outside through the receiving element.

7. A fuel tank arrangement according to claim 4, wherein the filler neck with the expansion space and at least one part of the venting device is formed as a one-piece component made of plastic that was produced by blow molding.

8. A fuel tank arrangement according to claim 1, wherein the expansion space is formed in one piece with the filler neck.

9. A fuel tank arrangement according to claim 2, including a filling collar wherein the largest width of the widening is developed to be approximately circular and extends concentrically with respect to the filling collar for supporting the filler neck at a vehicle body.

10. A fuel tank arrangement according to claim 9, wherein the largest diameter of the expansion space is at least twice as large as a diameter of the filler neck in the area of the filling collar.

11. A fuel filling arrangement for accommodating the filling of a motor vehicle fuel tank comprising:

a filler collar supportable at a vehicle body, a filler neck supported at the filler collar, said neck having a lower end and an upper portion, and said neck being connectable at the lower end to a vehicle fuel tank, a receiving element carried on the inside of the filler neck for guiding a position of a fuel filler nozzle tube when it is inserted for fuel filling operations, said receiving element projecting into the filler neck, and fuel nozzle abutment means locating a predetermined fuel filling position of a free, open end of the fuel filler nozzle tube in an upper part of the filler neck during fuel filling operations, wherein said filler neck is configured to widen upwardly in a funnel shape from a position approximately at a level of the free open end of the fuel filler nozzle tube when in its fuel filling position and to narrow down to the filler collar at the upper portion of the filler neck to thereby form a fuel accommodating expansion space disposed radially outwardly of the receiving element for limiting fuel overflow during fuel filling operations.

12. A fuel filling arrangement according to claim 11, wherein said receiving element is cylindrically formed and projects from the filler collar.

13. A fuel filling arrangement according to claim 11, wherein the expansion space has its largest diameter in the area of a section of the receiving element that projects out of the filling collar.

14. A fuel filling arrangement according to claim 11, further comprising a venting device provided outside the filler neck and connected with the filler neck, wherein the venting device leads into the expansion space.

15. A fuel filling arrangement according to claim 14, wherein the venting device leads into said expansion space in a area of the largest cross-section of the expansion space.

16. A fuel filling arrangement according to claim 14, wherein radial openings are provided at a section of the receiving element that projects out of the filling collar for accommodating air flow from the venting device to the outside through the receiving element.

17. A fuel filling arrangement according to Claim 14, wherein the filler neck with the expansion space and at least one part of the venting device is formed as a one-piece component made of plastic that was produced by blow molding.

18. A fuel filling arrangement according to claim 11, wherein the expansion space is formed in one piece with the filler neck.

19. A fuel filling arrangement according to claim 11, wherein the largest width of the expansion space is developed to be approximately circular and extends concentrically with respect to the filler collar.

20. A fuel filling arrangement according to claim 11, wherein the largest diameter of the expansion space is at least twice as large as a diameter of the filler neck in the area of the filler collar.

* * * * *